(12) United States Patent
Farnworth et al.

(10) Patent No.: US 11,028,025 B2
(45) Date of Patent: *Jun. 8, 2021

(54) PELLETISING PROCESS USING STARCH

(71) Applicant: York Potash Ltd, London (GB)

(72) Inventors: Steve Farnworth, Derbyshire (GB); Mike Evans, Staffordshire (GB); Jim Evans, Staffordshire (GB)

(73) Assignee: York Potash Ltd, London (GB)

( * ) Notice: Subject to any disclaimer, the term of this patent is extended or adjusted under 35 U.S.C. 154(b) by 495 days.

This patent is subject to a terminal disclaimer.

(21) Appl. No.: 15/515,995

(22) PCT Filed: Aug. 27, 2015

(86) PCT No.: PCT/GB2015/052476
§ 371 (c)(1),
(2) Date: Mar. 30, 2017

(87) PCT Pub. No.: WO2016/051130
PCT Pub. Date: Apr. 7, 2016

(65) Prior Publication Data
US 2017/0305805 A1    Oct. 26, 2017

(30) Foreign Application Priority Data
Sep. 30, 2014   (GB) ...................... 1417290

(51) Int. Cl.
*B01J 2/20* (2006.01)
*B01J 2/28* (2006.01)
(Continued)

(52) U.S. Cl.
CPC ................. *C05G 5/12* (2020.02); *B01F 3/18* (2013.01); *B01F 13/1025* (2013.01);
(Continued)

(58) Field of Classification Search
CPC . C05D 1/00; C05D 1/005; C05D 3/00; C05D 5/00; C05F 11/00; B01F 13/1025;
(Continued)

(56) References Cited

U.S. PATENT DOCUMENTS

| 1,946,068 A | | 2/1934 | Friedrich | |
|---|---|---|---|---|
| 2,369,110 A | * | 2/1945 | Harford | ..................... B01J 2/28 71/64.03 |

(Continued)

FOREIGN PATENT DOCUMENTS

| CN | 1246283 A | 3/2000 |
|---|---|---|
| CN | 1437852 A | 8/2003 |

(Continued)

OTHER PUBLICATIONS

Search Report Issued in GB1417290.2 dated Feb. 26, 2015.

(Continued)

*Primary Examiner* — Alexander M Weddle
(74) *Attorney, Agent, or Firm* — Mintz, Levin, Cohn, Ferris, Glovsky and Popeo, P.C.

(57) ABSTRACT

A method for manufacturing a pelletised mineral product, the method comprising: in a first mixing step, forming a first mixture by mixing the evaporite mineral with non-gelatinised starch under conditions that are insufficient to substantially gelatinise the starch; in a second mixing step, forming a second mixture by mixing the first mixture under conditions that are sufficient to substantially gelatinise the starch comprised within the first mixture; and forming the second mixture into pellets.

21 Claims, 1 Drawing Sheet

(51) Int. Cl.
*C05G 3/00* (2020.01)
*C05G 5/12* (2020.01)
*C05D 1/00* (2006.01)
*C05G 5/40* (2020.01)
*B01F 3/18* (2006.01)
*B01F 13/10* (2006.01)
*B01F 15/06* (2006.01)

(52) U.S. Cl.
CPC ............... *B01F 15/06* (2013.01); *B01J 2/20* (2013.01); *B01J 2/28* (2013.01); *C05D 1/00* (2013.01); *C05D 1/005* (2013.01); *C05G 5/40* (2020.02); *B01F 2015/062* (2013.01)

(58) Field of Classification Search
CPC ...... B01F 15/06; B01F 2015/062; B01F 3/18; B01J 2/20; B01J 2/28; C05G 3/0047; C05G 3/0058
See application file for complete search history.

(56) References Cited

U.S. PATENT DOCUMENTS

| | | | |
|---|---|---|---|
| 3,408,169 | A | 10/1968 | Thompson |
| 3,630,713 | A | 12/1971 | Adams et al. |
| 3,814,595 | A | 6/1974 | Boeglin et al. |
| 4,246,019 | A | 1/1981 | Sokolov et al. |
| 4,251,952 | A | 2/1981 | Porter et al. |
| 4,726,755 | A | 2/1988 | Holley |
| 4,792,350 | A | 12/1988 | Loeblich et al. |
| 4,848,675 | A | 7/1989 | Loeblich et al. |
| 5,174,804 | A * | 12/1992 | Rehberg ............... C05G 3/0052 504/101 |
| 5,188,654 | A | 2/1993 | Manalastas et al. |
| 5,256,711 | A * | 10/1993 | Tokiwa ............... C08L 3/02 523/124 |
| 5,435,821 | A | 7/1995 | Duvdevani et al. |
| 5,460,765 | A | 10/1995 | Derdall et al. |
| 5,623,781 | A | 4/1997 | Legro |
| 5,994,265 | A | 11/1999 | Barclay et al. |
| 6,013,209 | A | 1/2000 | Phinney |
| 6,132,484 | A | 10/2000 | Phinney |
| 6,156,699 | A | 12/2000 | Johnson et al. |
| 6,293,985 | B1 | 9/2001 | Phinney |
| 6,299,663 | B1 | 10/2001 | Phinney |
| 6,331,193 | B1 | 12/2001 | Phinney |
| 6,454,979 | B1 | 9/2002 | Phinney |
| 6,582,637 | B1 | 6/2003 | Phinney |
| 9,856,180 | B2 | 1/2018 | Farnworth et al. |
| 9,949,424 | B2 | 4/2018 | Meakin |
| 10,252,952 | B2 | 4/2019 | Farnworth et al. |
| 2001/0042494 | A1 | 11/2001 | Welshimer et al. |
| 2003/0022790 | A1 | 1/2003 | Hero et al. |
| 2003/0135957 | A1 | 7/2003 | Phinney |
| 2004/0009878 | A1 | 1/2004 | Lynch et al. |
| 2004/0033901 | A1 | 2/2004 | Adamoli et al. |
| 2004/0152596 | A1 | 8/2004 | Peltonen et al. |
| 2004/0221426 | A1 | 11/2004 | Igawa et al. |
| 2006/0010946 | A1 | 1/2006 | Mayhew et al. |
| 2010/0266745 | A1 | 10/2010 | Hoang et al. |
| 2012/0036906 | A1 | 2/2012 | Pedersen |
| 2012/0220454 | A1 | 8/2012 | Chen et al. |
| 2014/0072507 | A1 | 3/2014 | Chastain et al. |
| 2014/0346260 | A1 | 11/2014 | Kaps et al. |
| 2015/0027181 | A1 | 1/2015 | Ginn et al. |
| 2017/0096376 | A1 | 4/2017 | Farnworth et al. |
| 2017/0129823 | A1 | 5/2017 | Kaps et al. |

FOREIGN PATENT DOCUMENTS

| | | |
|---|---|---|
| CN | 102228052 A | 11/2011 |
| CN | 101503322 B | 3/2012 |
| DE | 1024244 B | 2/1958 |
| DE | 3618058 C1 | 2/1987 |
| DE | 102006034621 A1 | 1/2008 |
| EP | 2392204 A1 | 12/2011 |
| FR | 2612812 A1 | 9/1988 |
| GB | 983920 A | 2/1965 |
| GB | 1465979 A | 3/1977 |
| JP | S5269711 A | 6/1977 |
| JP | S54130311 A | 10/1979 |
| JP | S6170906 A | 4/1986 |
| JP | H0458805 A | 2/1992 |
| KR | 840002025 B1 | 11/1984 |
| SU | 925869 A1 | 5/1982 |
| SU | 1456395 A1 | 2/1989 |
| WO | WO-81/01421 A1 | 5/1981 |
| WO | WO-00/62916 A1 | 10/2000 |
| WO | WO-2004/046064 A1 | 6/2004 |
| WO | WO-2013/074328 A1 | 5/2013 |
| WO | WO-2014/026048 A2 | 2/2014 |
| WO | WO-2014/207495 A1 | 12/2014 |

OTHER PUBLICATIONS

International Search Report Issued in PCT/GB2015/052476 dated Nov. 26, 2015.
Database Biosis (Online) Biosciences Information Service, Philadelphia, PA, US; 1991, Barbarick K A: "Polyhalite Application to Sorghum-Sudangrass and Leaching in Soil Columns", Soil Science, vol. 151, No. 2, 1991, pp. 159-166 ; [Database accession No. PREV199191125076. EN abstract only. Web. Aug. 9, 2015. 2 pages.].
European Patent Office Examination Report issued in EP Application No. 15727442.4-1105, dated Jun. 4, 2019 (Jun. 4, 2019). 5 pages.
European Patent Office Examination Report issued in EP Application No. 15727444.0-1105, dated Mar 29, 2019 (May 29, 2019). 4 pages.
GB Search Report issued in GB Application No. GB1409799.2, dated Dec. 19, 2014. 5 pages.
GB Search Report issued in GB Application No. GB1409800.8, dated Dec. 23, 2014. 3 pages.
GB Search Report issued in GB Application No. GB1409801.6, dated Dec. 19, 2014. 3 pages.
GB Search Report issued in GB Application No. GB1410115.8, dated Oct. 24, 2014. 6 pages.
International Search Report and Written Opinion issued in International Application No. PCT/GB2015/051591, dated Sep. 16, 2015 (Sep. 16, 2015). 12 pages.
International Search Report and Written Opinion issued in International Application No. PCT/GB2015/051592, dated Sep. 16, 2015 (Sep. 16, 2015). 14 pages.
International Search Report and Written Opinion issued in International Application No. PCT/GB2015/051593, dated Sep. 15, 2015 (Sep. 15, 2015). 9 pages.
International Search Report and Written Opinion issued in International Application No. PCT/GB2015/051594, dated Sep. 16, 2015 (Sep. 16, 2015). 10 pages.
Mesh-Chart [online]. KMI Zeolite, Jul. 19, 2013 [retrieved on: Mar. 10, 2017]. 1 page. Retrieved from the internet: <http://www.kmizeolite.com/Mesh-Chart.html>.
Zontek, Stanley J. and Stanley J. Kostka, "Understanding the Difference Wetting Agent Chemistries." Green Section Record vol. 50 (15) Jul. 20, 2012. 1 page.

* cited by examiner

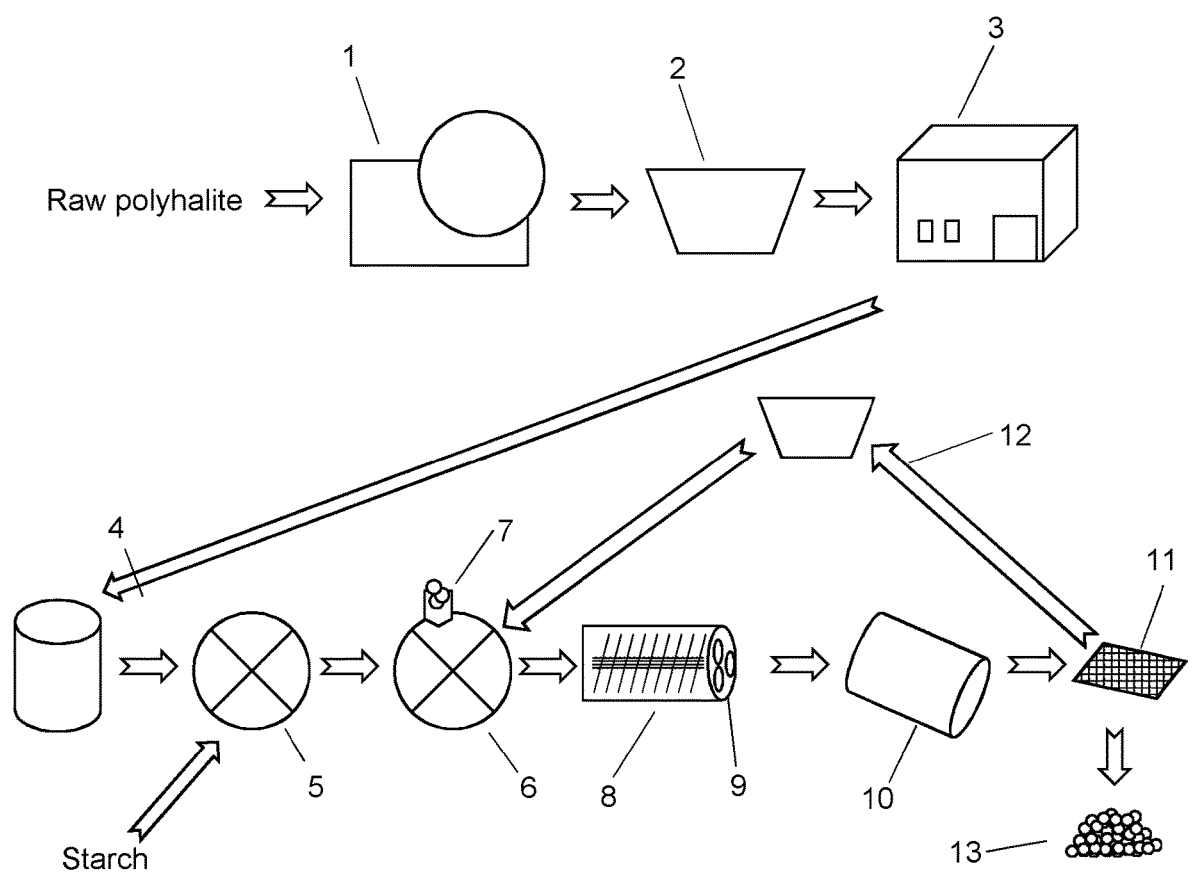

PELLETISING PROCESS USING STARCH

CROSS-REFERENCES TO RELATED APPLICATIONS

This application is a national stage entry, filed under 35 U.S.C. § 371, of International Application No. PCT/GB2015/052476, filed on Aug. 27, 2015, and claims the benefit of and priority to GB Patent Application No. 1417290.2, filed Sep. 30, 2014, the entire contents of each are hereby incorporated herein by reference in their entireties and for all purposes.

This invention relates to forming pelletised products, for example for use as fertiliser.

Polyhalite is an evaporite mineral. It is a complex hydrated sulphate of potassium, calcium and magnesium of general formula $K_2Ca_2Mg(SO_4)_4 \cdot 2H_2O$. Deposits of polyhalite occur in, amongst other countries, Austria, China, Germany, India, Iran, Turkey, Ukraine, the UK and the USA.

Polyhalite has the capacity to be valuable as a source of agricultural fertiliser. In some prior art processes it has been proposed to decompose natural polyhalite to extract specific nutrients. See, for example, WO 2013/074328, U.S. Pat. Nos. 1,946,068 and 4,246,019. However, intact polyhalite is also usable as a fertiliser, being able to supply sulphur, potassium, calcium and magnesium to the soil.

Mineral polyhalite can be spread in raw, crushed form. That minimises processing costs, but it has a number of disadvantages. Once applied to the soil the raw mineral takes some time to break down, delaying the bioavailability of its constituents. If applied in chipped form, the polyhalite tends to be of irregular shape and size, meaning that there can be difficulties in applying it uniformly, and that it can be difficult to apply using some types of agricultural spreading machinery. Untreated powdered polyhalite might in some circumstances be capable of being uniformly spread. However, since polyhalite powder can be strongly hygroscopic its mechanical properties can vary quickly and radically over time once exposed to air; and again it can be difficult to spread evenly with some types of machinery.

It is known to form urea into fertiliser pellets and to form limestone into pellets for dressing to increase soil pH. This can be done by mixing powdered urea or limestone with a binder and then processing it in a pan pelletiser.

It would be desirable to be able to form a readily spread fertiliser product using evaporite minerals such as polyhalite as the feedstock. However, it has been found that it is difficult to obtain a reliable pelletised product from such feedstocks. One difficulty has been found to arise from the problems surrounding controlling the take-up of water by the evaporite mineral, resulting in uneven operation of the process. Another difficulty has been found to arise from the problems surrounding binding of evaporite mineral powder into pellets, with binding being unreliable in some operational circumstances. It has been found that the binder needs to be carefully selected in order to achieve good results.

In the applicant's co-pending UK patent application number 1409801.6 a process is disclosed in which pre-gelled corn starch is used as a binder for pelletising polyhalite. Pre-gelled corn starch has been found to be highly effective as a binder for this application. However, pre-gelled corn starch can be a costly commodity, and it would be preferable to be able to pelletise polyhalite effectively using more readily available materials.

According to one aspect of the present invention there is provided a method for manufacturing a pelletised mineral product, the method comprising: in a first mixing step, forming a first mixture by mixing the mineral with non-gelatinised starch under conditions that are insufficient to substantially gelatinise the starch; in a second mixing step, forming a second mixture by mixing the first mixture under conditions that are sufficient to substantially gelatinise the starch comprised within the first mixture; and forming the second mixture into pellets.

The first mixing step or an initial stage of it may be performed substantially in the absence of free water. The first mixing step may comprise a first relatively high shear mixing phase and a second relatively low shear phase. The first mixing step may comprise a first relatively low shear mixing phase and a second relatively high shear phase.

The second mixing step may be performed in the presence of free water.

The method may comprise adding water to the first mixture during the second mixing step. The water may be added in the form of steam and/or vapour. The second mixing step may be performed by means of a mixer having a mixing chamber. The steam and/or vapour may be injected into the mixing chamber. The mixing chamber may be substantially enclosed.

The second mixing step may comprise applying heat to the first mixture. The heat may be applied solely through the mechanical action of the second and optionally the first mixing step. The heat may be additionally applied through the addition of the water. The heat may be additionally applied by means of a heater in or adjacent to the mixing chamber or one of the mixing chambers in which the second mixing step is performed.

The first mixing step may be performed in one or more mixers. The second mixing step may be performed in one or more mixers different from that or those in which the first mixing step is performed.

The step of forming the second mixture into pellets may comprise extruding the second mixture, e.g. through a die having one or more holes therethrough.

The step of forming the second mixture into pellets may comprise extruding the second mixture and tumbling the extrudate in a rotary dryer.

The mineral may be an evaporite mineral such as polyhalite. The mineral may be a hygroscopic mineral.

The first mixing step may comprise mixing the mineral in particulate form. The number or mass average grain size of the particulate mineral may be in the range from 50 to 500 µm.

The first mixing step may comprise mixing the starch in particulate form. The number or mass average grain size of the starch may be in the range from 300 to 700 µm.

According to a second aspect of the present invention there is provided a pelletising plant configured for performing the method as set out above.

The present invention will now be described by way of example with reference to the accompanying drawing.

FIG. 1 shows a generalised overview of a pelletising process.

In the process to be described below, pellets consisting primarily of an evaporite mineral are formed. In one example polyhalite powder is blended with non-gelatinised starch to form a dry homogeneous mixture. This mixture is then combined with water at elevated temperature so as to activate the starch and enable it to bind the polyhalite powder. Then the mixture of polyhalite, starch and water is further mixed, shaped and dried, yielding an output of polyhalite-comprising pellets. These pellets can be used as a fertiliser.

As indicated above, polyhalite is a complex hydrated sulphate of potassium, calcium and magnesium of general formula $K_2Ca_2Mg(SO_4)_4 \cdot 2H_2O$. Polyhalite has a Moh's hardness of around 2.5 to 3.5. It may be desired to form polyhalite into a spreadable fertiliser product. One way in which this can be done will now be described.

Polyhalite can be extracted from natural reserves by mining. Once mined, the polyhalite may be broken into blocks or chips of suitable size for transport and processing. For example, the as-mined rock may be fed to crushers such as jaw crushers and/or cone crushers in order to yield a chipped material of generally uniform size. It has been found that chips of largest dimension no greater than around 20 mm and/or of average dimension between 5 and 10 mm are convenient for transportation from a mine. The chips can be transported by conveyor, trucks or any other convenient mechanism.

The raw or chipped polyhalite is then processed to form a polyhalite powder. This may suitably be done by milling, for example in a ball mill (e.g. a continuous "Hardinge" ball mill) or more preferably an attritor mill. In an attritor mill the feedstock is agitated together with freely moving grinding elements such as steel balls. Air-swept suction may be applied in order to draw the milled material out of the mill. This allows the milling to be performed as a continuous process if desired, with chipped feedstock being added to the mill and powder being swept out of the mill by gas flow whilst the grinding elements continue to be agitated. The average grain size of the powder is dependent on various process parameters of the milling operation, including the dwell time of the feedstock in the mill. Conveniently, the mill may be arranged to produce polyhalite powder of a grain size generally around 200 µm: for example in the range from 50 to 500 µm or more preferably from 100 to 300 µm. Conveniently at least 50% or more preferably at least 70% of the mass of the polyhalite powder is composed of grains having a grain size, or a largest or average diameter, in one of the above ranges. The number average grain size of the polyhalite powder may be in one of those ranges. The grain size may be as measured by means of a Malvern Mastersizer 2000 or as measured by means of a sieve shaker.

In the next processing stage the polyhalite powder is combined with starch particles to form a dry homogeneous blend of polyhalite and starch. This mixing phase is preferably performed so that the polyhalite and starch are mixed in the absence of free water, since that allows the components to be blended together more easily and effectively. The polyhalite and starch may be combined in any suitable mixing device or series of mixing devices. In one example, the polyhalite and starch are fed separately into a single mixer, which is operated so as to output a homogeneous blend of polyhalite and starch. That mixer may be a relatively high shear mixer. It may for example be a pin mixer or a twin-shaft mixer. In a second example, the polyhalite and starch may be fed separately to a first mixer which performs initial mixing of the components, and the output of that first mixer may then be fed to a second mixer which mixes them further. In this two-stage process the first mixing stage may be performed at relatively low shear and the second mixing stage at relatively high shear, or vice versa. The first stage mixer may for example be a ribbon mixer, a pin mixer or a twin-shaft mixer. The second stage mixer may for example be a pin mixer or a twin-shaft mixer. It is advantageous for the or each mixer to be operated in a continuous process. To achieve that the feedstock: polyhalite and starch as separate feeds or as a partially blended single feed, can be fed to one end of the mixer and the agitation process can be arranged to feed material progressively towards a discharge opening at the opposite end of the mixer. The length of the mixer, the mixing speed and the agitator (e.g. pin or paddle) design can be selected so as to achieve sufficient dwell time in the mixer that the output from the mixture is of the desired homogeneity and/or plasticity: for example until it is substantially homogeneous. The operating power of the mixer can be controlled to apply the desired level of shear.

The starch may be derived from any convenient source, for example corn, potato, rice, tapioca or wheat. The starch could be a synthetic starch. The starch may consist essentially of chains of amylose and amylopectin. For example the content of the starch feed may comprise at least 50% and more preferably at least 75% amylose and amylopectin (in total) by weight. The starch may be in powdered form or in granules. Preferably the starch is of a powder having a grain size generally around 500 µm: for example in the range from 200 to 800 µm or more preferably from 350 to 650 µm. Conveniently at least 50% or more preferably at least 70% of the mass of the starch powder is composed of grains having a grain size, or a largest or average diameter, in one of the above ranges. The number average grain size of the starch powder may be in one of those ranges. The grain size may be as measured by means of a Malvern Mastersizer 2000 or as measured by means of a sieve shaker. The starch acts as a binder to help the polyhalite powder to adhere to itself, thereby increasing the strength of the eventual pellets. This is significant because the pellets should preferably be capable of resisting mechanical breakdown when spread through conventional agricultural spreaders. The binder also renders the polyhalite powder more plastic, which aids in the subsequent processing steps.

Thus, in one example of the first mixing stage the polyhalite powder is mixed with particulate starch, under dry conditions and in more or more mixing steps, to form a homogeneous dry blend. Water could alternatively be added during the first stage, but it is preferred that there is at least an initial dry mixing stage, performed substantially in the absence of free water. During the first mixing phase the mixture is preferable held under conditions under which gelling of the starch is inhibited, for example by keeping the mixture below the gelatinization temperature of the starch.

The proportion of starch to be added to the mixture will depend on the nature of the starch being used. The proportion should be selected so as to achieve satisfactory strength in the resulting polyhalite pellets.

In a second mixing stage the pre-blended polyhalite and starch mixture is mixed with water under conditions that are such as to cause the starch to gelatinise. Once gelatinised the starch can act to bind the polyhalite powder together. The process of gelatinisation involves the mixture being elevated to a suitable temperature, above the gelatinization temperature of the starch.

In one example of the second mixing stage, water is added to the polyhalite/starch mixture and the water is mixed together with the polyhalite and starch at a temperature below the temperature at which the starch will significantly gelatinise. Then in a second step the temperature of the mixture is raised whilst the mixture continues to be mixed, so as to cause the starch to gelatinise. To implement this, the output of the first, dry mixing stage can be passed to a first mixer where water is added to the polyhalite/starch blend and mixed into the blend, and then the output of that first mixer is passed to a second mixer in which the temperature is elevated. In a second example of the second mixing stage, water is added to the polyhalite/starch mixture under temperature conditions that are such that the starch will begin to significantly gelatinise when the water contacts the starch. Any suitable type of mixer may be used for the or each mixing step of the second mixing stage. Examples include pin mixers and twin-shaft mixers.

A range of methods may be employed to arrange that the starch is elevated to a sufficient temperature to permit gelatinisation. First, heat may be applied directly to the appropriate mixing vessel. For example, the mixing vessel may be fully or partially enclosed with a heating jacket. Or a heating element may be located within the mixing vessel. Second, the water may be heated before being applied to the polyhalite/starch mixture. In one specific example, the water may be introduced into the mixing vessel in the form of steam or vapour. For example the water as introduced may be at a temperature greater than 50° C. or 60° C. or 70° C. or 80° C. or 90° C. or 100° C. By introducing the water in the form of steam or vapour, gelling of the starch can be achieved particularly effectively, and it can be easier to achieve uniform combination of the steam or vapour with the starch than if liquid water is used. Third, the mechanical action of mixing of the polyhalite and starch can elevate the mixture's temperature, particularly if that mixing is performed with high shear. Each of these methods may be used alone or in any combination. For activation of the starch the mixture should preferably be at a temperature of at least 60° C. or 70° C.

In one preferred example, the first, dry mixing stage is performed with high shear so as to elevate the temperature of the mixture, and the output from the dry mixing stage is fed directly to a mixer for performing the second mixing stage. Water as steam or vapour is injected into the vessel of that second mixer. These measures may of themselves introduce sufficient heat that substantially all the starch in the mixture will be gelled. If necessary, the second mixer may be jacketed, and heat applied to the exterior of the mixing vessel of the second mixer whilst it mixes the polyhalite, starch and water in the second mixing stage.

The or each mixing vessel in which the second stage of mixing is performed is preferably substantially enclosed so as to resist the escape of water vapour and to retain heat in the mixture.

Once the starch is gelled, the starch and polyhalite can continue to be mixed to promote intimate binding between the gelled starch and the polyhalite powder. In a continuous mixing process in which the stock moves progressively through the mixing chamber, the length of the mixing chamber can be selected so that the material is not discharged until it has achieved a sufficient dwell time.

Once the polyhalite and gelled starch are sufficiently worked, the mixture is processed to divide it into individual pellets. One way in which this can be done is to feed the mixture to a screw extruder whose discharge end is fitted with a perforated die plate. The mixture is driven through the plate by the action of the screw. On the discharge side of the perforated plate the threads of polyhalite mixture may break off under their own weight. Alternatively the discharge side of the plate may be swept by a blade. The speed of the blade can be set in dependence on the feed rate of the mixture so that it breaks the threads into the desired length. The output of the extruder is wet, substantially spherical or rod-like pellets. Further water or steam may be added to the mixture in the extruder. The diameter of the holes in the plate is selected in dependence on the desired pellet size. The holes may, for example, be of a diameter in the range from 2 to 10 mm, more preferably 2.5 to 6 mm, for example around 3 or 4 mm.

The amount of water added during the second mixing stage (and optionally the extrusion stage) is conveniently such that the water content of the mixture at extrusion is in the range from 7 to 11%.

Once the mixture has been divided up in this way it can be dried so as to harden and stabilise the pellets. Before the pellets are dried it may be advantageous to tumble them so as to round them off. The output of the extruder can therefore be passed to a rotary dryer. The rotary dryer has a cylindrical drum that can be driven to rotate about its main axis. The axis is inclined so that material fed to the upper end of the drum will migrate to the lower end where it can be discharged. Hot air can be fed to the interior of the drum, for example to its lower end, or heat can be applied to the exterior of the drum. The region of the drum to which the wet mixture is fed may be smooth-walled so that the pellets roll against the interior of the drum to round off. The lower region of the drum may be provided with vanes or lifters that protrude inwardly from the walls of the drum. These lift the pellets as the drum rotates and drop them into the warm air in the drum, facilitating drying. On exiting the drum the pellets have been rounded and dried to a suitable hardness for shipping.

Other methods to pelletise the polyhalite/starch mixture could be used. For example, the mixture could be applied to a pan pelletiser which is then run to yield a collection of pellets of the appropriate size.

The pellets may then be screened to separate out undersize and over-size pellets. They can be roughly milled and returned to the input of the wet or dry mixing stages.

Finally the in-size pellets can be cooled and packaged, for example in 600 kg bags or 25 kg sacks, or shipped loose for use or further processing elsewhere FIG. 1 shows a generalised overview of the process described above. As-mined raw polyhalite is primary crushed in a jaw crusher 1 and secondary crushed in a cone crusher 2. This produces a chipped polyhalite product. The chipped polyhalite may be stored, e.g. in a warehouse 3, until shortly before it is to be processed by the subsequent steps. In contrast, it can be advantageous for the steps illustrated at 4 to 6 follow quickly one after the other, reducing the scope for the polyhalite powder to absorb ambient moisture and thereby better controlling the activation of the starch and the extrusion properties of the mixture. When required, the chipped polyhalite can be withdrawn from the store 3 and passed to an attritor mill or continuous ball mill 4 where it is rendered to a powder. The polyhalite powder is combined with starch in a first mixer 5. Then the blended polyhalite and starch are mixed in a high-shear mixer 6, with the addition of water as illustrated at 7. The contents of the high shear mixer are heated by a combination of one or more of: (i) pre-heating of the water before it is added to the mixer, (ii) applying heat to the mixer 6 and (iii) the mechanical action of the mixer 6 on its contents. The output of the high-shear mixer 6 is applied to a screw extruder 8, to which additional water may be added. The screw extruder causes the mixture to be extruded through perforations in a plate 9 set at its discharge end to form pellets. The pellets are then passed through a rotary dryer 10 to dry and round them, and then to a set of screens 11 for sizing the pellets. Undersize and oversize pellets are returned to the mixer 6 as indicated at 12. The final product at 13 consists of pellets of substantially spherical form and within the size limits defined by the screens 11. Those pellets can then be packaged and supplied for agricultural use. Eventually they can be spread on a field or other agricultural or horticultural substrate to act as a fertiliser.

Conveyor belts, auger conveyors or other handling apparatus can be used to move the components between processing stations.

Other additives may be included in the pellets. Such additives may one or more of the following, in any combination:
- a component having the effect of chemically and/or mechanically stabilising and/or preserving the pellets: for example to increase their shelf life, reduce their susceptibility to environmental contaminants or to reduce the likelihood of them being broken up during spreading (e.g. a pH buffer);
- a component having the effect of enhancing the fertilising effect of the polyhalite: for example by accelerating or retarding the breakdown of the polyhalite in the field;
- a component having the effect of protecting or enhancing the growth of crops by means other than fertilising: for example a herbicide, fungicide, insecticide, rodenticide, hormone, plant stimulant or mycorrhizal fungus or spore;
- a seed: which may be a seed of an angiosperm and/or of a crop species (e.g. a cereal such as wheat, maize, rice, millet, barley, oats or rye);
- a further fertiliser composition in addition to the polyhalite: for example a source of nitrogen and/or phosphorus;
- a pigment;
- a component having the effect of altering soil pH: for example lime, sulphur or a sulphate.

Such a component may be added at various stages in the process, for example it could be combined with the polyhalite powder prior to or during the first mixing stage as described above, or with the starch prior to the first mixing stage as described above, or with the polyhalite/binder mix between the first and second mixing stages as described above, or during the second mixing stage as described above, or it could be added to the extruder, or it could be sprayed or otherwise coated on to the pellets before or after drying.

The polyhalite content of the resulting pellets is preferably greater than 75% by weight, more preferably greater than 80% and most preferably greater than 90%.

The pellets are preferably substantially spherical, and of substantially uniform volume and mass. The pellets may have a mean Wadell sphericity of greater than 0.85, 0.90 or 0.95. The pellets are preferably substantially free from voids, for example having not more than 1%, 2% or 5% by volume of air.

The process as described above may be used for pelletising minerals other than polyhalite, and in particular for pelletising feedstocks composed principally of one or more evaporite minerals, especially other chloride minerals. These may include any one or more of Anyhdrite, Carnalite, Gypsum, Halite, Kainite, Kieserite, Langbeinite and/or Sylvite. The process is especially suitable for pelletising feedstocks composed principally of minerals that are substantially hygroscopic in recently powdered form and/or that have a Moh's hardness in the range from 2 to 4. The resulting pellets may be used for purposes other than fertilisation.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for manufacturing a pelletised mineral product, the method comprising:
   in a first mixing step, forming a first mixture by mixing polyhalite with non-gelatinised starch under conditions that are insufficient to substantially gelatinise the starch;
   in a second mixing step, forming a second mixture by mixing the first mixture under conditions that are sufficient to substantially gelatinise the starch comprised within the first mixture; and
   forming the second mixture into pellets; wherein the pellets comprise greater than 75% by weight polyhalite.

2. A method as claimed in claim 1, wherein the first mixing step is performed substantially in the absence of free water.

3. A method as claimed in claim 2, wherein the second mixing step is performed in the presence of free water.

4. A method as claimed in claim 3, comprising adding water to the first mixture during the second mixing step.

5. A method as claimed in claim 4, wherein the water is added in the form of steam.

6. A method as claimed in claim 4, wherein the water is added in the form of vapour.

7. A method as claimed in claim 1, wherein the second mixing step is performed in the presence of free water.

8. A method as claimed in claim 7, comprising adding water to the first mixture during the second mixing step.

9. A method as claimed in claim 8, wherein the water is added in the form of steam.

10. A method as claimed in claim 9, wherein the second mixing step is performed by means of a mixer having a mixing chamber and the steam is injected into the mixing chamber.

11. A method as claimed in claim 10, wherein the mixing chamber is substantially enclosed.

12. A method as claimed in claim 8, wherein the water is added in the form of vapour.

13. A method as claimed in claim 12, wherein the second mixing step is performed by means of a mixer having a mixing chamber and the vapour is injected into the mixing chamber.

14. A method as claimed in claim 1, wherein the second mixing step comprises applying heat to the first mixture.

15. A method as claimed in claim 1, wherein the first mixing step is performed in at least one first mixer and the second mixing step is performed in a second mixer different from the first mixer.

16. A method as claimed in claim 1, wherein the step of forming the second mixture into pellets comprises extruding the second mixture.

17. A method as claimed in claim 1, wherein the step of forming the second mixture into pellets comprises extruding the second mixture and tumbling the extrudate in a rotary dryer.

18. A method as claimed in claim 1, wherein the first mixing step comprises mixing the polyhalite in particulate form.

19. A method as claimed in claim 18, wherein the particulate form has an average grain size in the range from 50 to 500 μm.

20. A method as claimed in claim 1, wherein the first mixing step comprises mixing the starch in particulate form.

21. A method as claimed in claim 20, wherein the average grain size of the starch is in the range from 300 to 700 μm.

* * * * *